United States Patent
Meixner

(10) Patent No.: US 8,727,927 B2
(45) Date of Patent: May 20, 2014

(54) APPARATUS FOR SUPPORTING A PINION SHAFT OF A DIFFERENTIAL FOR A MOTOR VEHICLE

(75) Inventor: Christian Meixner, Ingolstadt (DE)

(73) Assignee: Audi AG, Ingolstadt (DE)

(*) Notice: Subject to any disclaimer, the term of this patent is extended or adjusted under 35 U.S.C. 154(b) by 177 days.

(21) Appl. No.: 13/354,605

(22) Filed: Jan. 20, 2012

(65) Prior Publication Data
US 2013/0017921 A1    Jan. 17, 2013

(30) Foreign Application Priority Data
Jan. 21, 2011    (DE) .......................... 10 2011 009 101

(51) Int. Cl.
*F16H 48/06*    (2006.01)

(52) U.S. Cl.
USPC .......................................................... 475/220

(58) Field of Classification Search
USPC .............................. 475/198, 220; 74/434, 325
See application file for complete search history.

(56) References Cited

U.S. PATENT DOCUMENTS

| | | | |
|---|---|---|---|
| 3,550,474 A * | 12/1970 | Maurice et al. ............. | 74/606 R |
| 3,557,634 A | 1/1971 | Bixby et al. | |
| 3,952,608 A | 4/1976 | Kanai et al. | |
| 4,141,424 A * | 2/1979 | Murayama et al. .......... | 180/53.2 |
| 4,351,196 A * | 9/1982 | Yoshida et al. ............. | 74/15.4 |
| 4,798,560 A | 1/1989 | Farrell | |
| 6,793,398 B2 | 9/2004 | Nahrwold et al. | |
| 8,348,513 B2 * | 1/2013 | Rusteberg et al. ............ | 384/517 |
| 2002/0183156 A1 * | 12/2002 | Gradu et al. ................. | 475/220 |
| 2013/0085031 A1 * | 4/2013 | Bassi et al. ................... | 475/220 |

FOREIGN PATENT DOCUMENTS

| | | |
|---|---|---|
| DE | 18 12 232 A | 12/1969 |
| DE | 100 49 197 A1 | 4/2002 |
| DE | 11 2006 001 007 T5 | 4/2008 |
| DE | 102007028948 | 12/2008 |
| EP | 0 192 339 | 8/1986 |
| WO | WO 2006/020694 A2 | 2/2006 |
| WO | WO 2009/000308 A1 | 12/2008 |

* cited by examiner

*Primary Examiner* — David D Le
*Assistant Examiner* — David J Hlavka
(74) *Attorney, Agent, or Firm* — Feiereisen LLC

(57) ABSTRACT

An apparatus includes a bearing assembly rotatingly supporting a pinion shaft of a differential for a motor vehicle. The bearing assembly has inner and outer rolling-contact bearings arranged in axially spaced-apart relationship and disposed in O-configuration. A driving gear is arranged on the pinion shaft between the inner and outer rolling-contact bearings and held on the pinion shaft circumferentially in fixed rotative engagement and/or formfitting engagement. Adjacent to the driving gear on the pinion shaft is an intermediate ring and adjacent thereto is an inner ring of the outer rolling-contact bearing. A locking ring is clamped in an annular groove of the pinion shaft. A spring element biases the driving gear against an annular shoulder of the pinion shaft via the intermediate ring and inner ring of the outer rolling-contact bearing, with the spring element being constrained between the inner ring of the outer rolling-contact bearing and the locking ring.

10 Claims, 1 Drawing Sheet

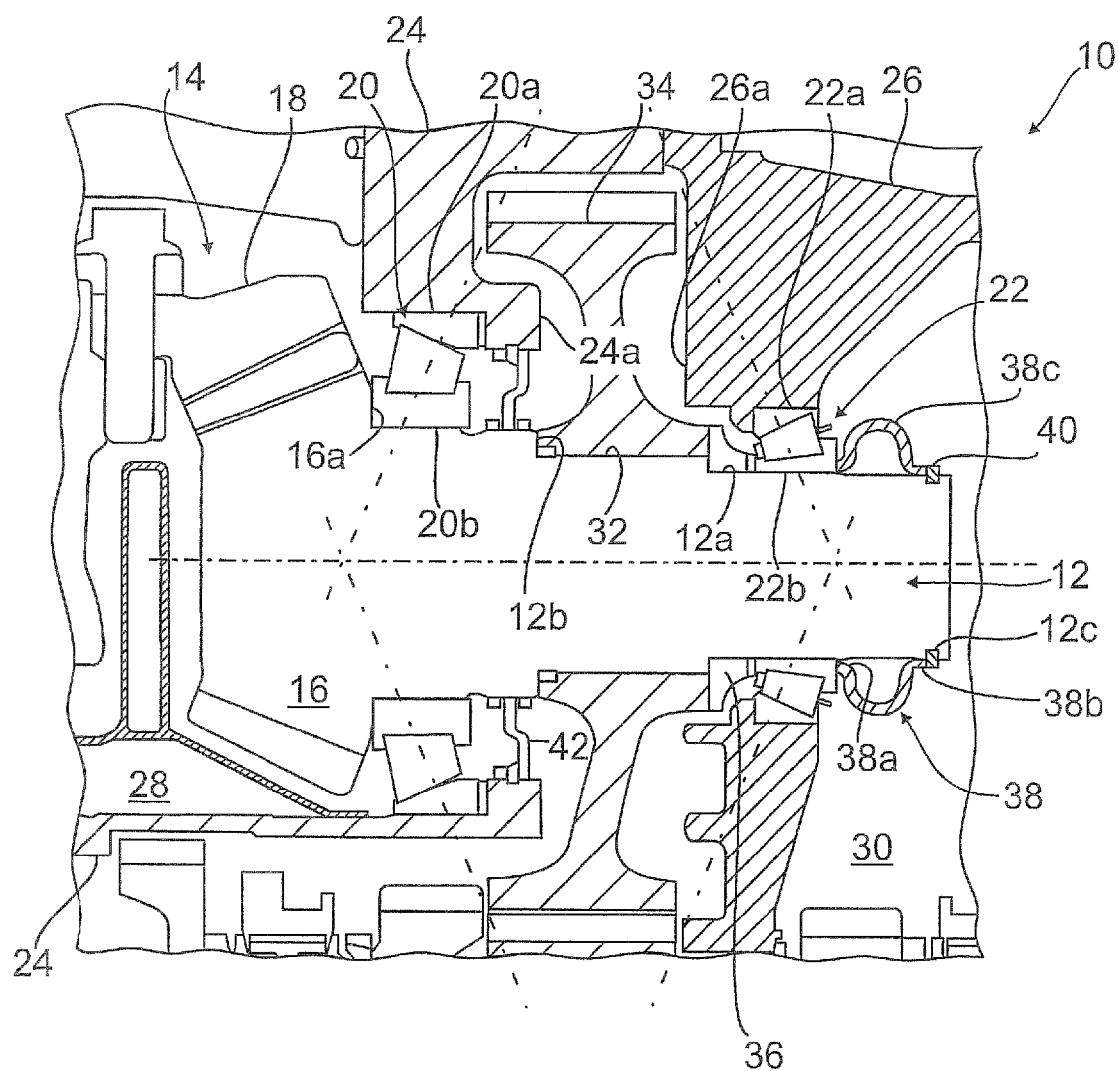

APPARATUS FOR SUPPORTING A PINION SHAFT OF A DIFFERENTIAL FOR A MOTOR VEHICLE

CROSS-REFERENCES TO RELATED APPLICATIONS

This application claims the priority of German Patent Application, Serial No. 10 2011 009 101.7, filed Jan. 21, 2011, pursuant to 35 U.S.C. 119(a)-(d), the content of which is incorporated herein by reference in its entirety as if fully set forth herein.

BACKGROUND OF THE INVENTION

The present invention relates to an apparatus for supporting a pinion shaft of a differential for a motor vehicle.

The following discussion of related art is provided to assist the reader in understanding the advantages of the invention, and is not to be construed as an admission that this related art is prior art to this invention.

U.S. Pat. No. 3,952,608 discloses a final drive unit in a motor vehicle drive line connecting a propeller or drive shaft with vehicle driving wheels through a differential drive. The final drive unit includes a drive pinion which is in constant mesh with a ring gear of a differential. The pinion shaft of the drive pinion is rotatably mounted in a carrier housing by means of front and rear pinion bearings. Between the inner bearing races of the front and rear pinion bearings, a cylindrical sleeve or collapsible spacer is interposed surrounding the pinion shaft for supplying the two opposite pinion bearings with preload. The collapsible spacer is made in the form of a thin walled metal tubular spacer which is disposable in use in a compressed state between a pair of spaced pinion shaft bearings in a final drive unit to preload the pinion bearings. The tubular spacer is generally cylindrical and has a circumferential bulged portion to facilitate longitudinal compression of the tubular spacer, and has a cylindrical portion having at least one elongated opening therethrough. The elongated opening is oriented with its major dimension extending in the longitudinal dimension of the tubular spacer and facilitates torsional deformation of the cylindrical portion having at least one elongated opening therethrough.

In such a support of the pinion shaft, very narrow manufacturing tolerances must be maintained to ensure an even preload to the pinion bearings across the entire operating range and to attain an adequate running smoothness of the differential during operation of the motor vehicle on the traction side and also on the overrun side.

It would therefore be desirable and advantageous to address these problems and to obviate other prior art shortcomings.

SUMMARY OF THE INVENTION

According to one aspect of the present invention, an apparatus includes a bearing assembly rotatingly supporting a pinion shaft of a differential for a motor vehicle, the bearing assembly having inner and outer rolling-contact bearings in axially spaced-apart relationship, with the inner rolling-contact bearing placed closer to a drive pinion of the pinion shaft than the outer rolling-contact bearing, the inner and outer rolling-contact bearings being disposed in O-configuration, a driving gear arranged on the pinion shaft between the inner and outer rolling-contact bearings and held on the pinion shaft in circumferential direction in fixed rotative engagement and/or formfitting engagement, an intermediate ring placed on the pinion shaft adjacent to the driving gear, with the outer rolling-contact bearing having an inner ring placed adjacent to the intermediate ring, a locking ring clamped in an annular groove of the pinion shaft, and a spring element biasing the driving gear against an annular shoulder of the pinion shaft via the intermediate ring and the inner ring of the outer rolling-contact bearing, with the spring element being constrained or clamped between the inner ring of the outer rolling-contact bearing and the locking ring.

In accordance with the present invention, the outer rolling-contact bearing can be supported on an overrun side in a constructively simple and cost-efficient manner while at the same time securing the driving gear of the variable speed transmission. Furthermore, it has been surprisingly found that a relatively high preload torque for the bearing assembly can be maintained across the entire operating range of the differential by using the spring element. The spring element is hereby configured with sufficient spring force to be able to support axial forces encountered during travel of the motor vehicle and caused by the drive pinion in particular during overrun operation.

By forming the restraint for the spring element by a locking ring clamped in an annular groove of the pinion shaft to maintain the spring element under tension, a simple manufacturing solution is realized that does not require the provision of threads and shaft nut constructions. Compared to shaft nuts, the spring element including the associated locking ring can be produced in an extremely weight-beneficial manner.

According to another advantageous feature of the present invention, the driving gear can be placed onto the pinion shaft via a sliding connection.

According to another advantageous feature of the present invention, the drive pinion may be configured in the form of a bevel pinion.

According to another advantageous feature of the present invention, the bearing assembly may be configured in the form of a tapered roller bearing assembly.

According to another advantageous feature of the present invention, the spring element may be configured in the form of a steel spring having an Ω-shaped (omega-shaped) cross section and/or waved cross section. Suitably, the spring element has opposite sides, each side being formed with an annular collar projecting in axial direction. Such a steel spring is easy to manufacture while applying high preload forces and requiring little installation space in axial direction.

According to another advantageous feature of the present invention, a common transmission case for housing the variable speed transmission and the differential may be provided, wherein the pinion shaft can be arranged in the variable speed transmission, with the differential being integrated in the variable speed transmission, and with the transmission case having adjacent end walls for respectively supporting the inner and outer rolling-contact bearings. The driving gear can be configured as a spur gear which is placed onto the pinion shaft via a serration to enable a sliding connection. As a result, the integrated differential with a driving gear of the variable speed transmission positioned between the inner and outer rolling-contact bearings can be manufactured in a simple and durable manner and requires little axial installation space.

According to another advantageous feature of the present invention, the transmission case can have a differential space which is bounded by one of the end walls, and a transmission space, with a shaft sealing ring being arranged between the one of the end walls and the pinion shaft for separating the differential space and the transmission space from one another in an oil-tight manner. Thus, the inner rolling-contact bearing is disposed in the differential space, and the driving gear and the outer rolling-contact bearing are disposed in the transmission case.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a longitudinal section of a portion of a variable speed transmission with integrated differential in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment can be illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a longitudinal section of a portion of a variable speed transmission, generally designated by reference numeral 10, for use in a motor vehicle. Integrated in the variable speed transmission 10 is a differential 14 which is shown only to the extent necessary for the understanding of the present invention. The variable speed transmission 10 and the differential 14 share a common transmission case, comprised of two housing portions 24, 26 and shown only in part. The housing portion 24 forms a differential space 28 and the housing portion 26 forms a transmission space 30 which both contain lubricating oil for lubrication of moving differential and transmission elements.

A pinion shaft 12 drives the differential 14 and includes a bevel pinion 16 which is in engagement with a differential ring gear 18 of the differential 14 through intervention of, for example, a hypoid gearing. The differential 14 may be configured as a common differential bevel gear mechanism for driving the front wheels of the motor vehicle for example.

The pinion shaft 12 is rotatably supported in an axially immobile manner by two rolling-contact bearings 20, 22 which are received in the assembled transmission case 24, 26 and supported on respective end walls 24a, 26a. Currently preferred is a configuration of the rolling-contact bearings 20, 22 in the form of tapered roller bearings which are oriented in O-configuration, as indicated by the dash-dot action lines. The outer rolling-contact bearing 22 is hereby placed further away from the bevel pinion 16 than the inner rolling-contact bearing 20 which is placed immediately adjacent to the bevel pinion 16.

The rolling-contact bearings 20, 22 have outer rings 20a, 22a which are press-fitted in corresponding bearing bores of the end walls 24a, 26a and axially immobile in load direction. The inner rings 20b, 22b of the rolling-contact bearings 20, 22 are press-fitted onto rotation-symmetric shaft portions of the pinion shaft 12, with the inner ring 20b of the rolling-contact bearing 20 resting upon an annular shoulder 16a formed by the bevel pinion 16.

The pinion shaft 12 is further provided with a serration 32 for engagement by a driving gear 34 of the variable speed transmission 10. The driving gear 34 which is configured, by way of example, as a spur gear 34 is arranged between the end walls 24a, 26a and is continuously driven by transmission elements of the variable speed transmission, not further described.

The pinion shaft 12 has a shaft portion 12a of reduced diameter on which an intermediate disk 36 and axially adjacent thereto the inner ring 22b of the rolling-contact bearing 22 are mounted. The intermediate disk 36 bears hereby upon the hub of the driving gear 34 and urges the hub of the driving gear 34 against an annular shoulder 12b of the pinion shaft 12.

To provide a defined preload between the rolling-contact bearings 20, 22 across the entire operating range and to receive the axial components of possibly traction and thrust forces from the hypoid gearing or bevel gearing between bevel pinion 16 and ring gear 18, a spring element 38 in the form of, for example, a steel spring of waved cross section and defined material thickness is placed upon the shaft portion 12a of the pinion shaft 12. Instead of a steel spring, the spring element 38 may, of course, also be configured in any other suitable manner, for example as disk spring or disk spring assembly.

The spring element 38 is provided with an axially projecting ring collar 38b which rests against the confronting end face of the inner ring 22b, and an oppositely oriented ring collar 38b which is supported on a locking ring 40 which is clamped in a corresponding annular groove 12c of the shaft portion 12a. The spring element 38 defines a hemispherical middle portion 38c which connects on opposite ends to the ring collars 38a, 38 via rounded transitions. The spring element 38 is dimensioned with respect to material thickness and spring rate such as to maintain the rolling-contact bearings 20, 22 under a defined preload across the entire operating range of the variable speed transmission 10 and the differential 14.

The spring element 38 is mounted onto the pinion shaft 12 in a clamping tool (not shown) by which the spring element 38 is compressed in axial direction until the locking ring 40 snaps in the clamping tool into the corresponding annular groove 12c of the pinion shaft 12. Currently preferred is a configuration of the locking ring 38 in the form of circlip.

The transmission space 30 is separated from the differential space 28 in an oil-tight manner by a shaft sealing ring 42 which is press-fitted in an annular projection of the end wall 24a and snugly fits on a shaft portion provided between the inner ring 20b of the inner rolling-contact bearing 20 and the hub of the driving gear 34. As a result, the rolling-contact bearing 20 is positioned within the differential space 28 whereas the driving gear 34 and the outer rolling-contact bearing 22 are arranged in the transmission space 30.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. Apparatus, comprising:
   a bearing assembly rotatingly supporting a pinion shaft of a differential for a motor vehicle, said bearing assembly having inner and outer rolling-contact bearings in axially spaced-apart relationship about the pinion shaft, with the inner rolling-contact bearing placed closer to a drive pinion of the pinion shaft than the outer rolling-contact bearing;

a driving gear arranged on the pinion shaft between the inner and outer rolling-contact bearings and held on the pinion shaft in circumferential direction in fixed rotative engagement or formfitting engagement or both;

an intermediate ring placed on the pinion shaft adjacent to the driving gear, said outer rolling-contact bearing having an inner ring placed adjacent to the intermediate ring;

a locking ring clamped in an annular groove of the pinion shaft; and a spring element biasing the driving gear against an annular shoulder of the pinion shaft via the intermediate ring and the inner ring of the outer rolling-contact bearing, said spring element being constrained between the inner ring of the outer rolling-contact bearing and the locking ring.

2. The apparatus of claim 1, wherein the driving gear is placed onto the pinion shaft via a sliding connection.

3. The apparatus of claim 1, wherein the pinion shaft is a component of a variable speed transmission.

4. The apparatus of claim 1, wherein the drive pinion is a bevel pinion.

5. The apparatus of claim 1, wherein the bearing assembly is a tapered roller bearing assembly.

6. The apparatus of claim 1, wherein the spring element is a steel spring having an Ω-shaped cross section or waved cross section or both.

7. The apparatus of claim 1, wherein the spring element has opposite sides, each side being formed with an annular collar projecting in axial direction.

8. The apparatus of claim 3, further comprising a common transmission case for housing the variable speed transmission and the differential, wherein the pinion shaft is arranged in the variable speed transmission, with the differential being integrated in the variable speed transmission, said transmission case having adjacent end walls for respectively supporting the inner and outer rolling-contact bearings, said driving gear being a spur gear placed onto the pinion shaft via a serration to enable a sliding connection.

9. The apparatus of claim 8, wherein the transmission case has a differential space which is bounded by one of the end walls, and a transmission space, and further comprising a shaft sealing ring arranged between the one of the end walls and the pinion shaft for separating the differential space and the transmission space from one another in an oil-tight manner, said inner rolling-contact bearing being disposed in the differential space, and said driving gear and said outer rolling-contact bearing being disposed in the transmission case.

10. The apparatus of claim 1, wherein the locking ring is configured in the form of a circlip.

* * * * *